(12) United States Patent
Garewal

(10) Patent No.: US 11,099,735 B1
(45) Date of Patent: Aug. 24, 2021

(54) FACILITATING THE RECOVERY OF FULL HCI CLUSTERS

(71) Applicant: VMware, Inc., Palo Alto, CA (US)

(72) Inventor: Ishvarjit Singh Garewal, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/794,207

(22) Filed: Feb. 18, 2020

(51) Int. Cl.
*G06F 3/06* (2006.01)
*G06F 9/455* (2018.01)

(52) U.S. Cl.
CPC .......... *G06F 3/0608* (2013.01); *G06F 3/0644* (2013.01); *G06F 3/0659* (2013.01); *G06F 3/0664* (2013.01); *G06F 3/0673* (2013.01); *G06F 9/45558* (2013.01); *G06F 2009/45579* (2013.01); *G06F 2009/45583* (2013.01)

(58) Field of Classification Search
CPC .... G06F 3/0608; G06F 3/0644; G06F 3/0659; G06F 3/0664; G06F 3/0673; G06F 9/45558; G06F 2009/45579; G06F 2009/45583
See application file for complete search history.

(56) References Cited

U.S. PATENT DOCUMENTS

| | | | |
|---|---|---|---|
| 2008/0189700 A1* | 8/2008 | Schmidt | G06F 11/203 718/1 |
| 2015/0058306 A1* | 2/2015 | Earl | G06F 11/1471 707/703 |
| 2015/0113223 A1* | 4/2015 | Brown | G06F 12/0238 711/133 |
| 2020/0004570 A1* | 1/2020 | Glade | G06F 9/45558 |

OTHER PUBLICATIONS

VMWare's thick provisioning, https://docs.vmware.com/en/VMware-vSphere/6.0/com.vmware.vsphere.storage.doc/GUID AC8E9C20-C05F-4FB5-A5DA-11D0A77A291B.html; Downloaded Feb. 18, 2020.
NetApp's overwrite reserve; https://library.netapp.com/ecmdocs/ECMP1141781/html/GUID-188DFF0C-34CB-4589-978C-083F6BD1B9BA.html; Downloaded Feb. 18, 2020.
NetApp's Snapshot reserve, https://library.netapp.com/ecmdocs/ECMP1196991/html/GUID-901983DC-6BF0-4C84-8B55-257403340C8B.html, Downloaded Feb. 18, 2020.

* cited by examiner

*Primary Examiner* — Eric T Oberly
(74) *Attorney, Agent, or Firm* — Fountainhead Law Group P.C.

(57) ABSTRACT

Techniques for facilitating the recovery of a full hyper-converged infrastructure (HCI) cluster are provided. In one set of embodiments, a hypervisor of a host system in the HCI cluster can create a recovery reserve on a disk group of the host system, where the disk group stores a namespace object component of a virtual machine (VM), and where the recovery reserve corresponds to an amount of storage space reserved on the disk group for the namespace object component. Then, at a time of receiving a write request directed to the namespace object component, the hypervisor can (1) determine that the disk group is out of space, (2) determine that the write request is a recovery I/O (input/output) that is useful for freeing space on the disk group, and upon determining (1) and (2), allow the write request to succeed by consuming space from the recovery reserve.

21 Claims, 5 Drawing Sheets

FACILITATING THE RECOVERY OF FULL HCI CLUSTERS

BACKGROUND

In a hyper-converged infrastructure (HCI) cluster comprising a plurality of host systems, persistent data associated with the cluster's virtual machines (VMs) is maintained in the form of storage objects (e.g., namespace objects, virtual disk objects, etc.) that are distributed across the local storage resources (e.g., disk groups) of the host systems. To optimize storage space utilization in such clusters, administrators typically enable thin provisioning, which is a storage provisioning model that allocates space to storage objects in a flexible on-demand manner, as well as deduplication, which is a technique for removing redundant data blocks on disk.

While thin provisioning and deduplication are effective tools for storage optimization, when an HCI cluster with these two features turned-on becomes "full"—in other words, when one or more disk groups of the cluster's host systems run out of free storage space—all further writes to the full disk group(s) will fail, thereby necessitating a recovery process to reclaim some of the consumed storage space (and thus avoid the write failures). However, with existing HCI implementations, VM management operations that enable such a recovery will also fail due to the need to issue certain writes to disk. This leads to a scenario where the cluster administrator is stuck with a full cluster and cannot gracefully recover from that full state.

DETAILED DESCRIPTION

Figure 1:
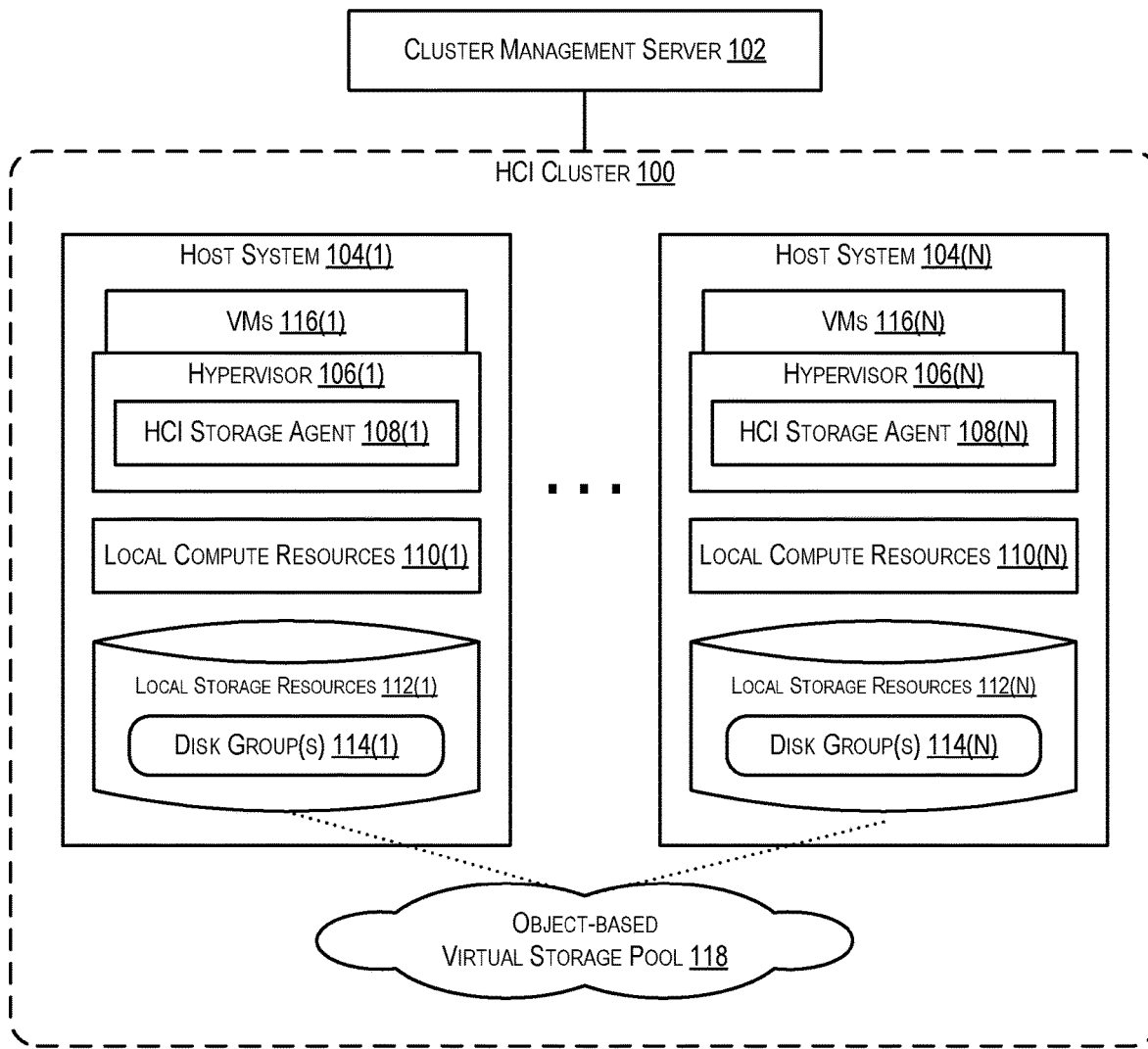
FIG. 1 depicts an example HCI cluster according to certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for facilitating the recovery of a full HCI cluster that has thin provisioning and deduplication enabled, where "recovery" refers to the process of freeing/reclaiming consumed storage space in the cluster to an extent that avoids write failures arising out of a lack of space. More particularly, these techniques ensure that VM management operations typically used by an administrator for freeing up consumed storage space in the cluster (e.g., VM power-off, export, delete, etc.) can be successfully completed as part of the recovery process, despite the cluster's full state.

At a high level, the techniques of the present disclosure employ the concept of a "recovery reserve," which is a relatively small amount of storage space (on the order of, e.g., tens of megabytes (MB)) that is set aside, at the time of a VM's creation, in each host disk group where a component of the VM's namespace object is placed. This recovery reserve amount is subtracted from the disk group's advertised physical storage capacity that is made visible/accessible for servicing regular storage I/O (input/output).

When a disk group of the HCI cluster becomes full and a cluster administrator initiates a VM management operation—such as VM power-off—with respect to a VM that has a namespace object component on that full disk group in an attempt to free space, the hypervisor of the host system containing the full disk group can receive write requests directed to the namespace object component and can identify a subset of those write requests as being "recovery I/Os" that have been generated by the initiated VM management operation and thus are necessary for space recovery. Examples of such recovery I/Os include atomic test-and-set (ATS) write requests for obtaining/releasing locks on VM configuration files within the namespace object and metadata write requests for updating file system metadata in the VM's namespace object.

The hypervisor can then allow the write requests that have been identified as recovery I/Os to be admitted for processing at the storage layer (even though the disk group is technically out of space per its advertised storage capacity) by taking space, as needed, from the recovery reserve associated with the namespace object component. In this way, the hypervisor can ensure that the VM management operation will complete successfully and thus ensure that recovery of the cluster from the full state can be achieved. These and other aspects of the present disclosure are described in further detail in the sections that follow.

2. Example HCI Cluster and Host-Level Solution Architecture

FIG. 1 is a simplified block diagram of an example HCI cluster 100 in which embodiments of the present disclosure can be implemented. As shown, HCI cluster 100 is communicatively coupled with a cluster management server 102 and comprises a plurality of host systems 104(1)-(N). Each host system 104 includes, among other things, a hypervisor 106 with an HCI storage agent 108, a set of local compute resources (e.g., central processing units (CPUs)) 110, and a set of local storage resources (e.g., directly-attached solid state disks, magnetic disks, etc.) 112 that are grouped into one or more disk groups 114. In a particular embodiment, each disk group 114 can include one high-endurance solid state disk for read/write caching and one or more lower-endurance solid state disks or magnetic disks for capacity storage.

Hypervisors 106(1)-(N) are configured to virtualize the local compute resources of host systems 104(1)-(N) and allocate the virtualized compute resources to one or more locally running virtual machines (VMs) 116(1)-(N). Each VM, in turn, is configured to utilize the compute resources provided by its respective hypervisor to execute computing workloads (e.g., guest applications) via a guest operating system (OS) layer.

HCI storage agents 108(1)-(N) residing within hypervisors 106(1)-(N) are configured to aggregate disk groups 114(1)-(N) of host systems 104(1)-(N) into an object-based virtual storage pool 118 and make virtual storage pool 118 available to VMs 116(1)-(N) for data storage purposes. In this way, the persistent data used by VMs 116(1)-(N) can be maintained directly on host systems 104(1)-(N) rather than on separate, dedicated storage servers/arrays.

The "object-based" qualifier for virtual storage pool 118 indicates that HCI storage agents 108(1)-(N) manage VM data in pool 118 in the form of storage objects, where a "storage object" is a logical data volume/container composed of one or more components, and where a "component" is a sub-object that contains some portion of the data and/or metadata of its parent storage object. In various embodiments, it is assumed that each VM 116 of HCI cluster 100 is associated with at least three types of storage objects within virtual storage pool 118: (1) a namespace object configured to store the VM's metadata/configuration files (e.g., .vmx file, log files, etc.), (2) one or more virtual disk objects configured to store the contents of the VM's virtual hard disk drive(s), and (3) and a swap object configured to hold the virtual memory swap space of the VM at VM runtime.

Figure 2:
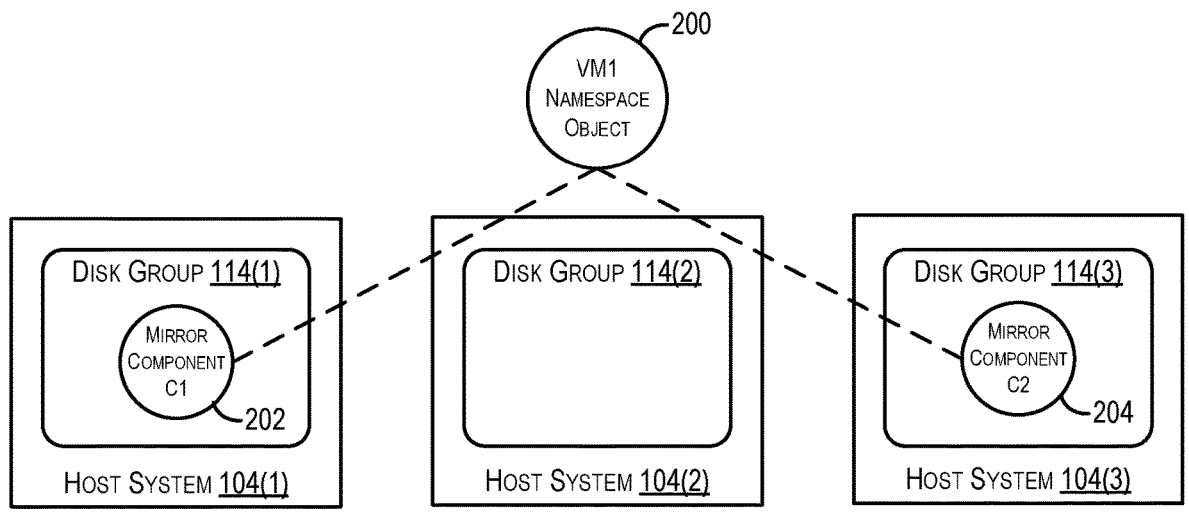
FIG. 2 depicts an example component structure/layout for a VM namespace object according to certain embodiments.

In addition, it is assumed that the components of these VM storage objects are distributed across the disk groups of host systems 104(1)-(N) (which form the physical storage layer of virtual storage pool 118) in accordance with RAID (Redundant Array of Independent Disks) storage policies that are defined at the VM level. For example, FIG. 2 depicts the component structure/layout of an example namespace object 200 for a VM referred to as "VM1" that has a storage policy indicating that all of VM1's storage objects should be mirrored on two different fault domains (e.g., disk groups) of HCI cluster 100 in accordance with RAID-1. Per this storage policy, namespace object 200 is composed of two RAID-1 mirror components C1 (reference numeral 202) and C2 (reference numeral 204) that are stored on separate disk groups 114(1) and 114(3) of host systems 104(1) and 104(3) respectively.

As noted in the Background section, to optimize storage space utilization, the administrator(s) of an HCI cluster like cluster 100 of FIG. 1 will often enable thin provisioning and deduplication. Thin provisioning is a feature that allows storage objects to be created within the cluster without pre-allocating any space for those objects at the physical storage (i.e., disk group) layer; instead, storage space is allocated on-demand for the objects as they grow in size. Deduplication is a feature that maintains a single copy of redundant data (i.e., data referenced by multiple logical offsets) on the cluster's physical storage, thereby reducing the total amount of storage space needed to store that data.

While thin provisioning and deduplication work well as long as the storage usage of an HCI cluster remains sufficiently below its maximum capacity, in scenarios where the cluster becomes full (i.e., one or more of the cluster's disk groups runs out of available storage space), all further writes to the full disk group(s), including overwrites, will fail. This is because when deduplication is enabled, overwrites to existing data may require the allocation of new data blocks on disk, and thus all overwrites also need a free space check. This, in turn, means that a recovery process is needed to reclaim some amount of consumed storage space in the full cluster and thereby allow the cluster to once again operate as normal.

Unfortunately, with existing HCI implementations, VM management operations that are commonly used to free storage space in an HCI cluster will also fail when the cluster is thinly provisioned/deduplicated and in a full state. To understand why this is the case, consider the VM power-off operation, which frees storage space by deleting a VM's swap object from disk (and also allows the VM's namespace/virtual disk objects to be exported to another storage location and subsequently deleted once the VM is powered-off). Upon being initiated, the VM power-off operation results in, among other things, (1) the opening of one or more configuration files within the VM's namespace object (to read the VM's current running state), and (2) the updating of certain file system metadata parameters in the namespace object. Action (1) requires an on-disk lock to be acquired for each file to be opened, which in turn causes an ATS write to the namespace object to be generated in order to overwrite the file's lock state. Further, action (2) causes one or more file system metadata writes to the namespace object to be generated in order to update the relevant metadata parameters. However, if the disk group(s) where the VM's namespace object component(s) reside are full, both the ATS write(s) and the file system metadata write(s) will fail due to the mechanics of thin provisioning and deduplication. For example, although an ATS write to acquire an on-disk lock typically overwrites existing data (rather than writing new data), in deduplication an overwrite must check for space, so even a modification to existing data will fail if thin provisioned. As a result, the VM power-off operation as a whole will fail, thereby preventing any storage space from being freed via that operation or via follow-on VM export/delete operations.

As an alternative to powering-off/exporting/deleting VMs, it is possible to wipe the entirety of the full disk group in order to recover storage space and return the cluster to a normal (i.e., non-full) state. But, if the full disk group contains data that is not replicated or backed up elsewhere, this brute force approach will cause unrecoverable data loss. In addition, once the wiped disk group is re-added to the cluster's storage pool, a resynchronization process (which involves copying over certain VM storage object components to that disk group from other cluster disk groups) is required to ensure that all storage objects within the cluster regain compliance with their respective VM-level RAID storage policies. This resynchronization process is resource intensive and, depending on the amount of data being resynchronized, can potentially take a very long time (e.g., on the order of hours or even days).

Figure 3:
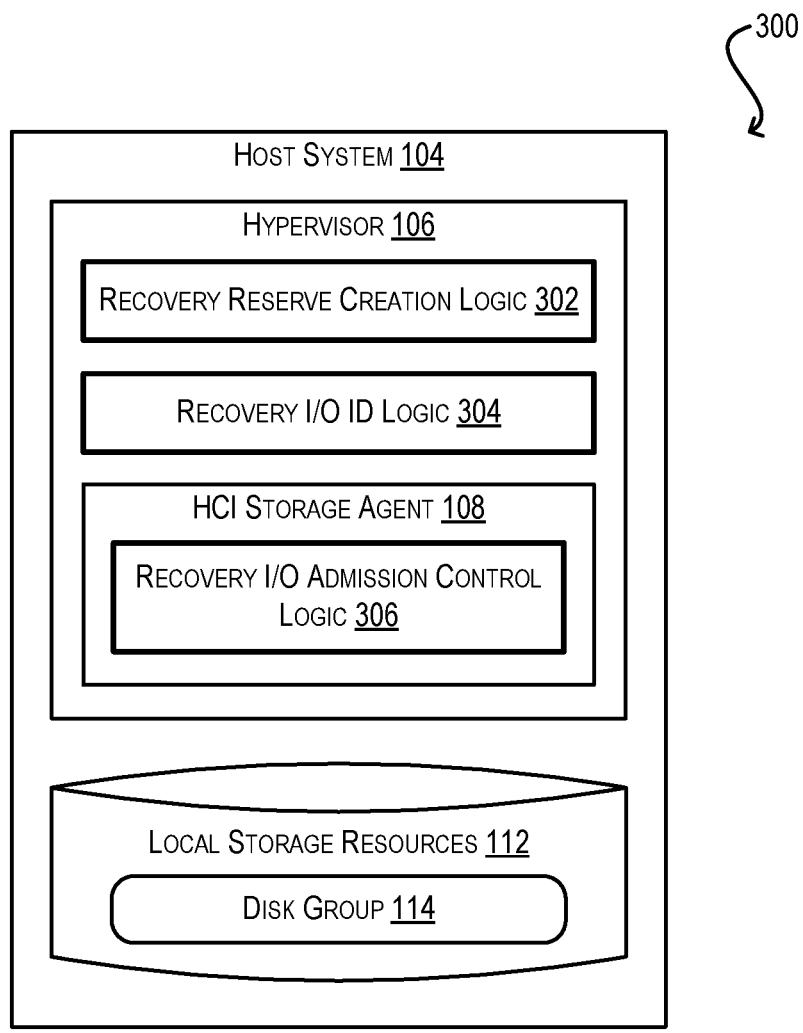
FIG. 3 depicts a host system architecture according to certain embodiments.

To address the foregoing and other similar problems, FIG. 3 depicts a novel architecture 300 that can be implemented within each host system 102 of HCI cluster 100 for facilitating recovery of cluster 104 from a full state according to certain embodiments. As shown, this architecture includes, as part of hypervisor 106 and HCI storage agent 108, a recovery reserve creation logic component 302, a recovery I/O identification (ID) logic component 304, and a recovery I/O admission control logic component 306.

Generally speaking, at the time a VM is created/deployed within HCI cluster 100 and the VM's namespace object (or more precisely, a component thereof) is placed on a disk group 114 of host system 102 of FIG. 3, recovery reserve creation logic 302 can set aside a relatively small amount of storage space on disk group 114, referred to as the VM's recovery reserve, for that namespace object component. In a particular embodiment, the maximum size of the recovery reserve can be approximately 10 MB, although this value can be increased or decreased based upon various factors such the specific characteristics of the cluster. The purpose of this recovery reserve, which is not made visible/available for normal storage I/O on disk group 114, is to provide a free space buffer that allows write requests arising out of space recovery management operations directed to that VM namespace object to succeed in the specific scenario where disk group 114 becomes full.

Then, as write requests to the VM's namespace object component on disk group 114 are issued and received by hypervisor 106 via HCI storage agent 108, recovery I/O ID logic 304 can check whether each incoming write request to the namespace component is a type of write request that was generated as part of a VM management operation needed/useful for space recovery (e.g., a VM power-off, export, delete, etc.). If so, recovery I/O ID logic 304 can add a tag to the write request indicating that it is a "recovery I/O" and pass the tagged write request to recovery I/O admission control logic 306. If not, recovery I/O ID logic 304 can simply pass the write request as-is (i.e., without a recovery I/O tag) to recovery I/O admission control logic 306.

Upon receiving a tagged or untagged write request from logic component 304, recovery I/O admission control logic 306 can first check whether there is sufficient free space in disk group 114, per the disk group's advertised storage capacity, to "admit" the write request (in other words, enable the write request to be processed at the storage layer) and thus allow it to succeed. If there is insufficient free space (which indicates that disk group 114 is now full), recovery I/O admission control logic 306 can further check whether the write request is tagged as a recovery I/O. Finally, if the write request is tagged as a recovery I/O (which indicates that the write request was generated by a VM management operation and is needed for space recovery), recovery I/O admission control logic 306 can admit the write request and account for the admission by consuming space, as needed, from the recovery reserve of the namespace object component (note that the particular mechanics for tracking space usage in the recovery reserve is discussed in detail in section (4) below).

With this general approach and architecture, a number of benefits are achieved. First, by creating and consuming recovery reserves for VM namespace object components as explained above, each host hypervisor 106 can ensure that recovery I/Os directed to those namespace object components will succeed (assuming the recovery reserves are appropriately sized), even if the disk groups on which the namespace object components reside are ostensibly out of space. This, in turn, means that VM management operations which generated those recovery I/Os will complete successfully, and thus a graceful recovery from the full state is possible. Such a graceful recovery is highly preferable over the brute force approach of wiping disk groups because it avoids the issues with potential data loss and resynchronization overhead/time arising from that brute force approach.

Second, because the per-namespace object component recovery reserves are only used to admit recovery I/Os (and no other storage I/Os) in the specific scenario where the target disk groups for those recovery I/Os have become full, the size of each recovery reserve can be kept to a relatively small size (e.g., on the order of tens of MB). This is significantly smaller than, for example, thickly provisioning each VM namespace object component to avoid write failures, which would require the entire address space (e.g. 255 GB) to be pre-allocated per component (even if the entirety of that 255 GB is never used).

Third, by facilitating graceful recovery from the full state with relatively little storage overhead per VM, the solution of the present disclosure empowers cluster administrators/users to run their HCI clusters at high storage utilization rates (e.g., 90% or more), without fear of dealing with intractable out-of-space situations. Thus, this solution provides for superior storage cost efficiency over existing HCI implementations, which generally recommend steady-state storage utilization rates of 70% or lower when thin provisioning and deduplication are enabled in order to avoid running out of space.

The remaining sections of the present disclosure provide additional details regarding the workflows that may be carried out by logic components 302, 304, and 306 of FIG. 3 for facilitating storage space recovery in HCI cluster 100 according to certain embodiments. It should be appreciated that FIGS. 1-3 are illustrative and not intended to limit embodiments of the present disclosure. For example, although FIG. 3 depicts recovery I/O ID logic 304 and recovery I/O admission control logic 306 as separate entities, in alternative embodiments the functionality attributed to these logic components may be performed by a single entity/module within the HCI storage stack of hypervisor 106. Further, the various entities shown in FIGS. 1-3 may include sub-components and/or implement functions that are not specifically described. One of ordinary skill in the art will recognize other variations, modifications, and alternatives.

3. Creating the Recovery Reserve

Figure 4:
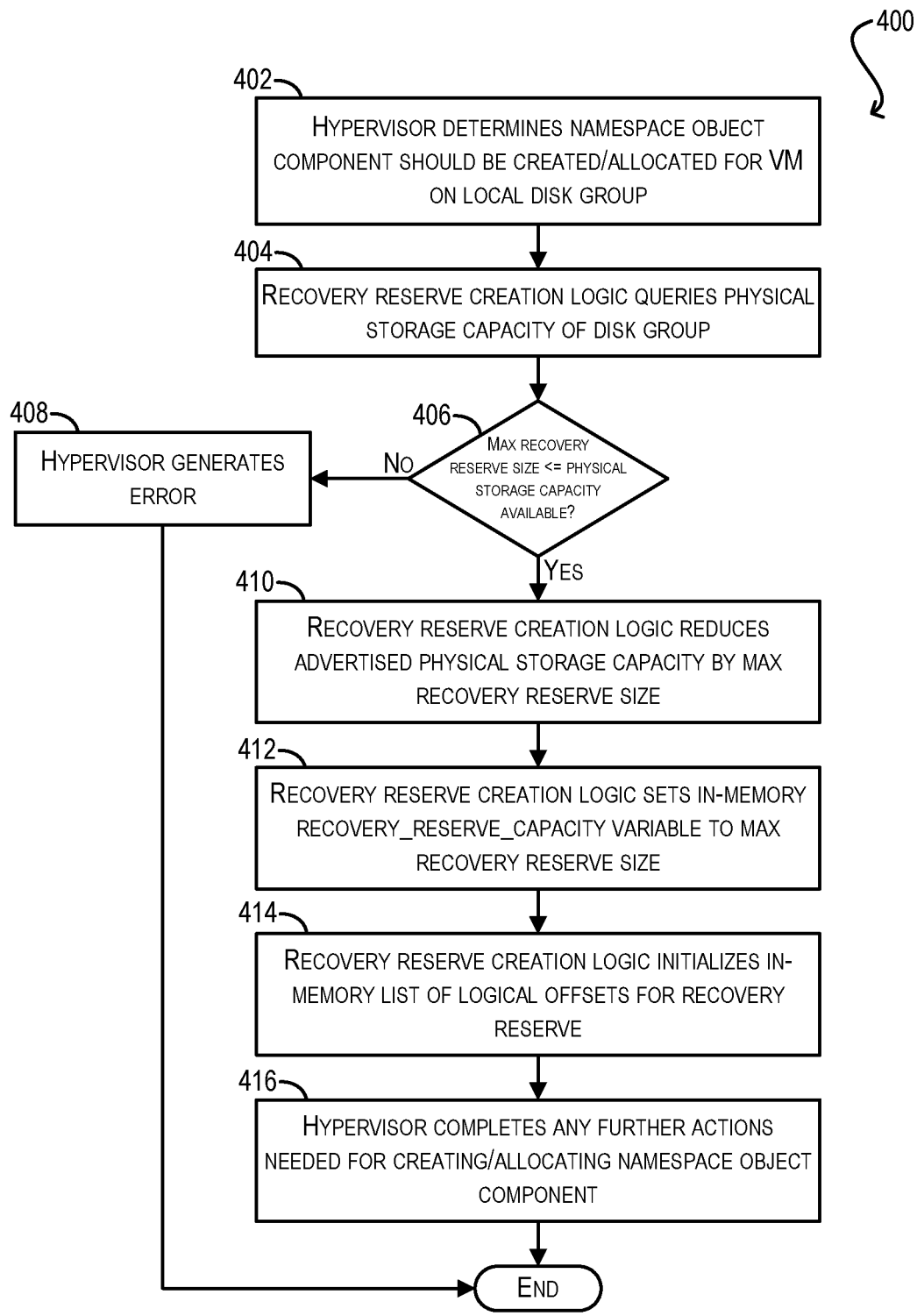
FIG. 4 depicts a workflow for creating a recovery reserve for a VM namespace object component on a disk group according to certain embodiments.

FIG. 4 depicts a workflow 400 that may be executed by hypervisor 106 of FIG. 3 and its constituent recovery reserve creation logic 302 for creating/allocating a namespace object component for a VM 116 on a local disk group 114 of host system 102 and, as part of that process, creating a recovery reserve for the namespace object component on that disk group according to certain embodiments. Workflow 400 assumes thin provisioning is enabled and thus the amount of storage space that needs to be pre-allocated for the namespace object component itself is zero.

In one set of embodiments, workflow 400 may be executed at the time VM 116 is initially created/deployed within HCI cluster 100 and the VM's namespace object component is placed on disk group 114 by, e.g., cluster management server 102 of FIG. 1. In other embodiments, workflow 400 may also be executed each time host system 102 is rebooted and VM 116 is "opened" by hypervisor 106. Further, in cases where the VM's namespace object is composed of multiple components placed on different disk groups, workflow 400 may be executed with respect to each of those disk groups (such that a separate recovery reserve is created for each namespace object component on each disk group).

Starting with blocks 402-406, hypervisor 106 can determine that a namespace object component for VM 116 should be created/allocated on disk group 114 and, in response, recovery reserve creation logic 302 can query for the amount of physical storage space currently free in disk group 114 and check whether the desired maximum size of the VM's recovery reserve (which is a predefined amount, such as 10 MB), will fit within that free space. If the answer at block 406 is no, hypervisor 106 can generate an error indicating that there is insufficient space to create/allocate the VM's namespace object/component on the disk group (block 408) and workflow 400 can end.

However if the answer at block 406 is yes, recovery reserve creation logic 302 can establish a recovery reserve on disk group 114 for the namespace object component by (1) reducing the "advertised" physical storage capacity of disk group 114 (i.e., the physical storage space in the disk group that is available for normal storage I/O) by the predefined recovery reserve size (block 410), and (2) setting an in-memory variable indicating the amount of available capacity in this new recovery reserve (e.g., "recovery_reserve_capacity") to the predefined maximum recovery reserve size (block 412). In addition, recovery reserve creation logic 302 can initialize an in-memory data structure for holding a list of logical offsets pertaining to the new recovery reserve (which will be used for tracking which logical offsets have consumed space in the recovery reserve, as explained below) (block 414). Finally, at block 416, hypervisor 106 can complete any further actions needed for creating/allocating the namespace object component on disk group 114 and terminate the workflow.

4. Handling Write Requests

Figure 5:
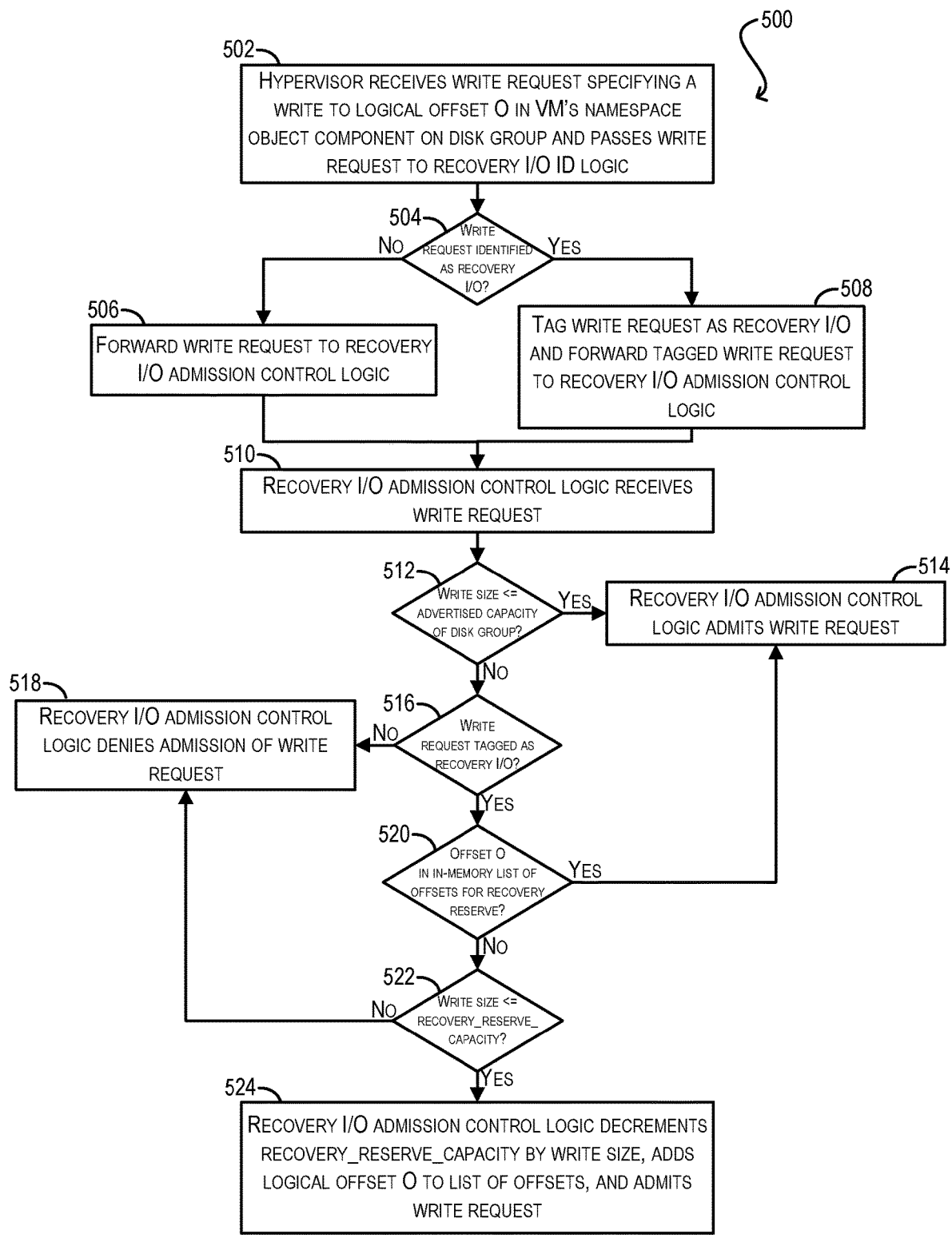
FIG. 5 depict a workflow for handling write requests directed to a VM namespace object component according to certain embodiments.

FIG. 5 depicts a workflow 500 that may be executed by hypervisor 106/recovery I/O ID logic 304/recovery I/O admission control logic 306 of FIG. 3 for handling write requests directed to the namespace object component of VM 116 that has been created/allocated on local disk group 114 via workflow 400 according to certain embodiments. Workflow 500 assumes that a recovery reserve for the namespace object component has been established on disk group 114 per blocks 410-414 of workflow 400.

Starting with blocks 502 and 504, hypervisor 106 can receive a write request that specifies a write to a logical offset O within the namespace object component of VM 116 and can pass the write request to recovery I/O ID logic 304, which can check whether the write request is a recovery I/O. As mentioned previously, a "recovery I/O" is a write request that is generated by a VM management operation and is deemed to be needed or useful for space recovery, such as ATS writes and file system metadata writes that are generated by the VM power-off operation. In a particular embodiment, recovery I/O ID logic 304 can perform the check at block 504 by examining one or more fields of the write request and determining whether those examined fields meet one or more predefined criteria or rules indicating that the request is a recovery I/O.

If recovery I/O ID logic 304 determines at block 504 that the write request is not a recovery I/O, logic 304 can simply forward the write request to recovery I/O admission control logic 306 without modifications (block 506). Otherwise, logic 304 can add a tag to the write request indicating that it is a recovery I/O and forward the tagged request to recovery I/O admission control logic 306 (block 508).

At blocks 510 and 512, recovery I/O admission control logic 306 can receive the write request forwarded by recovery I/O ID logic 304 and check whether the size of the data to be written via the write request is less than or equal to the current advertised physical storage capacity of disk group 114. If the answer is yes (which indicates that there is enough free space in the disk group to accommodate the write), recovery I/O admission control logic 306 can admit the write request (block 514).

On the other hand, if the answer at block 512 is no (which indicates that the disk group is full), recovery I/O admission control logic 306 can proceed to check whether the write request has been tagged as a recovery I/O (block 516). If the write request has not been tagged as a recovery I/O, recovery I/O admission control logic 306 can deny admission of the write request (block 518).

However, if the write request has been tagged as a recovery I/O, recovery I/O admission control logic 306 can conclude that the write request should be admitted by leveraging the recovery reserve for the namespace object component on disk group 114, to the extent possible. Accordingly, at block 520, recovery I/O admission control logic 306 can check whether logical offset O (i.e., the offset being written by the write request) is included in the in-memory list of logical offsets for the recovery reserve previously initialized at block 414 of workflow 400.

If the answer at block 520 is no (which indicates that the write request is a "new" recovery I/O that logic 306 has not seen since disk group 114 became full), recovery I/O admission control logic 306 can further check whether there is sufficient free space in the recovery reserve to accommodate the write (by comparing the write size with the in-memory recovery_reserve_capacity variable) (block 522). If not, recovery I/O admission control logic 306 can deny admission of the write request per previous block 518; otherwise, recovery I/O admission control logic 306 can decrement the recovery_reserve_capacity variable by the write size (thereby "consuming" that amount of space from the recovery reserve), add logical offset O to the in-memory list of offsets (to record that this offset has consumed space from the reserve), and admit the write request (block 524). Note that the consumption of space from the recovery reserve at block 524 is pessimistic in nature because logic 306 does not know at this point whether the write request comprises unique data (which will require a new allocation on disk) or redundant data (which will not require a new allocation, per the mechanics of deduplication).

Finally, if recovery I/O admission control logic 306 determines at block 520 that logical offset O is included in the in-memory list of logical offsets (which indicates that the write request is an overwrite to an offset that has already consumed space from the recovery reserve), logic 306 can directly admit the write request, without checking for available space in the recovery reserve or decrementing the recovery_reserve_capacity variable (block 514). This is because N overwrites to the same logical offset can only increase the usage of the recovery reserve by one data block, and thus once a write to a given logical offset has been accounted for per block 524, any further overwrites to that same offset can be safely allowed without space checking the recovery reserve.

It should be appreciated that workflow 500 of FIG. 5 is illustrative and various modifications are possible. For example, although not shown in FIG. 5, in the scenario where disk group 114 becomes full and subsequently recovers from that full state via the admission of recovery I/O using VM 116's recovery reserve, recovery I/O admission control logic 306 can reset the in-memory recovery_reserve_capacity variable to once again reflect the predefined maximum recovery reserve size and can clear out the in-memory list of logical offsets. In this way, logic 306 can reset the usage of namespace object component's recovery reserve on disk group 114 so that the entirety of the reserve will be available for use the next time the disk group becomes full.

Further, although workflow 500 indicates that recovery I/O ID logic 304 tags write requests which it has recognized as being recovery I/Os with a generic "recovery I/O" tag, in some embodiments logic 304 can tag such write requests with more granular information, such as information identifying each write request as being one of a predefined set of specific recovery I/O types (e.g., an ATS/lock write, a file system metadata write, etc.). In these embodiments, the recovery reserve can be partitioned according to these recovery I/O types (e.g., 5 MB of reserve space for ATS/lock writes, 5 MB of reserve space for file system metadata writes, etc.) and recovery I/O admission control module 306 can process recovery I/Os in a manner that ensures recovery I/Os of a certain type will only consume space from its corresponding recovery reserve partition.

5. Example Recovery Scenario with VM Power-Off

To further clarify the processing presented in workflow 500 of FIG. 5, the following is an example sequence of events that may occur in accordance with workflow 500 in an example scenario where (1) disk group 114 becomes full, and (2) an administrator (or some other user/agent) of HCI cluster 100 initiates a power-off of VM 116 in order to free up storage space on disk group 114 and recover from the full state:

1. The power-off operation results in the opening of a configuration file within VM 116's namespace object component on disk group 114
2. The file open operation requires acquiring an on-disk lock on the configuration file, thus generating an ATS write to the namespace object component to update the lock state
3. Hypervisor 106 receives the ATS write request and recovery I/O ID logic 304 identifies/tags the ATS write request as a recovery I/O
4. Recovery I/O admission control logic 306 receives the ATS write request and determines that disk group 114 is full
5. Recovery I/O admission control logic 306 determines that the ATS write request is tagged as a recovery I/O and thus admits the write request, despite the full state of the disk group
6. If the ATS write request is to a new logical offset within the namespace object component, recovery I/O admission control logic 306 decrements the capacity of the component's recovery reserve on disk group 114 and adds that offset to its in-memory list of offsets for VM 116/disk group 114
7. The lock is acquired and the VM 116 is powered off
8. The powering-off of VM 116 results in an attempt to delete VM 116's swap object from disk group 114, which generates a (FS) file system metadata write to the namespace object component
9. Hypervisor 106 receives the FS metadata write request and recovery I/O ID logic 304 identifies/tags the FS metadata write request as a recovery I/O
10. Recovery I/O admission control logic 306 receives the FS metadata write request and determines that disk group 114 is full
11. Recovery I/O admission control logic 306 determines that the FS metadata write request is tagged as a recovery I/O and thus admits the write request, despite the full state of the disk group
12. If the FS metadata write request is to a new logical offset within the namespace object component, recovery I/O admission control logic 306 decrements the capacity of the component's recovery reserve on disk group 114 and adds that offset to its in-memory list of offsets for VM 116/disk group 114
13. VM's swap file is successfully deleted and the VM power-off operation is complete Once VM 116 is powered off and its swap object is deleted per step (13) above, the cluster administrator may take additional steps as needed to in order to further reduce the consumed storage space on disk group 114 to an acceptable/desired level. For example, in one embodiment the cluster administrator may export the powered-off VM to another storage location/cluster and then delete the VM. Alternatively, the cluster administrator may power-off additional VMs residing on disk group 114, initiating a live migration of one or more VMs and their storage objects to another disk group/host system/cluster, and so on.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Yet further, one or more embodiments can relate to a device or an apparatus for performing the foregoing operations. The apparatus can be specially constructed for specific required purposes, or it can be a general-purpose computer system selectively activated or configured by program code stored in the computer system. In particular, various general-purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid-state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while certain virtualization methods referenced herein have generally assumed that virtual machines present interfaces consistent with a particular hardware system, persons of ordinary skill in the art will recognize that the methods referenced can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization. The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for facilitating recovery of a hyper-converged infrastructure (HCI) cluster when one or more disk groups of the HCI cluster become full, the method comprising:
   creating, by a hypervisor of a host system in the HCI cluster, a recovery reserve on a disk group of the host system, wherein the disk group stores a namespace object component of a virtual machine (VM), and wherein the recovery reserve corresponds to an amount of storage space reserved on the disk group for the namespace object component; and
   at a time of receiving a write request directed to the namespace object component:
      determining, by the hypervisor, that the disk group is out of space;
      determining, by the hypervisor, that the write request is a recovery I/O (input/output) that is useful for freeing space on the disk group;
      upon determining that the disk group is out of space and that the write request is a recovery I/O, allowing, by the hypervisor, the write request to succeed by consuming space from the recovery reserve.

2. The method of claim 1 wherein the write request is not allowed to succeed if the disk group is out of space and the write request is not a recovery I/O.

3. The method of claim 1 wherein determining that the write request is a recovery I/O comprises:
   determining that the write request is an atomic test-and-set write for locking a file in the namespace object component or a metadata write for updating file system metadata in the namespace object component.

4. The method of claim 1 wherein determining that the write request is a recovery I/O comprises:
   determining that the write request was generated by a power-off, export, or delete operation for the VM.

5. The method of claim 1 wherein creating the recovery reserve comprises:
   reducing an advertised physical storage capacity of the disk group by a maximum size for the recovery reserve;
   setting an in-memory variable configured to track available capacity in the recovery reserve to the maximum size; and
   initializing an in-memory list of logical offsets that have consumed space from the recovery reserve.

6. The method of claim 5 wherein determining that the disk group is out of space comprises:
   determining that a write size of the write request exceeds the advertised physical storage capacity of the disk group.

7. The method of claim 5 further comprising, prior to allowing the write request to succeed:
   determining whether a logical offset to which the write request is directed is in the in-memory list of logical offsets; and
   if the logical offset is not in the in-memory list:
      decrementing the in-memory variable by a write size of the write request; and
      adding the logical offset to the in-memory list.

8. A non-transitory computer readable storage medium having stored thereon program code executable by a hypervisor of a host system in a hyper-converged infrastructure (HCI) cluster, the program code embodying a method for facilitating recovery of the HCI cluster when one or more disk groups of the HCI cluster become full, the method comprising:
   creating a recovery reserve on a disk group of the host system, wherein the disk group stores a namespace object component of a virtual machine (VM), and wherein the recovery reserve corresponds to an amount of storage space reserved on the disk group for the namespace object component; and
   at a time of receiving a write request directed to the namespace object component:
      determining that the disk group is out of space;
      determining that the write request is a recovery I/O (input/output) that is useful for freeing space on the disk group;
      upon determining that the disk group is out of space and that the write request is a recovery I/O, allowing the write request to succeed by consuming space from the recovery reserve.

9. The non-transitory computer readable storage medium of claim 8 wherein the write request is not allowed to succeed if the disk group is out of space and the write request is not a recovery I/O.

10. The non-transitory computer readable storage medium of claim 8 wherein determining that the write request is a recovery I/O comprises:
   determining that the write request is an atomic test-and-set write for locking a file in the namespace object component or a metadata write for updating file system metadata in the namespace object component.

11. The non-transitory computer readable storage medium of claim 8 wherein determining that the write request is a recovery I/O comprises:
   determining that the write request was generated by a power-off, export, or delete operation for the VM.

12. The non-transitory computer readable storage medium of claim 8 wherein creating the recovery reserve comprises:
   reducing an advertised physical storage capacity of the disk group by a maximum size for the recovery reserve;
   setting an in-memory variable configured to track available capacity in the recovery reserve to the maximum size; and
   initializing an in-memory list of logical offsets that have consumed space from the recovery reserve.

13. The non-transitory computer readable storage medium of claim 12 wherein determining that the disk group is out of space comprises:
   determining that a write size of the write request exceeds the advertised physical storage capacity of the disk group.

14. The non-transitory computer readable storage medium of claim 12 wherein the method further comprises, prior to allowing the write request to succeed:
    determining whether a logical offset to which the write request is directed is in the in-memory list of logical offsets; and
    if the logical offset is not in the in-memory list:
        decrementing the in-memory variable by a write size of the write request; and
        adding the logical offset to the in-memory list.

15. A host system comprising:
    a processor;
    a hypervisor;
    a disk group; and
    a non-transitory computer readable medium having stored thereon program code that, when executed by the processor, causes the hypervisor to:
        create a recovery reserve on the disk group, wherein the disk group stores a namespace object component of a virtual machine (VM), and wherein the recovery reserve corresponds to an amount of storage space reserved on the disk group for the namespace object component; and
        at a time of receiving a write request directed to the namespace object component:
            determine that the disk group is out of space;
            determine that the write request is a recovery I/O (input/output) that is useful for freeing space on the disk group;
            upon determining that the disk group is out of space and that the write request is a recovery I/O, allow the write request to succeed by consuming space from the recovery reserve.

16. The host system of claim 15 wherein the write request is not allowed to succeed if the disk group is out of space and the write request is not a recovery I/O.

17. The host system of claim 15 wherein the program code that causes the hypervisor to determine that the write request is a recovery I/O comprises program code that causes the hypervisor to:
    determine that the write request is an atomic test-and-set write for locking a file in the namespace object component or a metadata write for updating file system metadata in the namespace object component.

18. The host system of claim 15 wherein the program code that causes the hypervisor to determine that the write request is a recovery I/O comprises program code that causes the hypervisor to:
    determine that the write request was generated by a power-off, export, or delete operation for the VM.

19. The host system of claim 15 wherein the program code that causes the hypervisor to create the recovery reserve comprises program code that causes the hypervisor to:
    reduce an advertised physical storage capacity of the disk group by a maximum size for the recovery reserve;
    set an in-memory variable configured to track available capacity in the recovery reserve to the maximum size; and
    initialize an in-memory list of logical offsets that have consumed space from the recovery reserve.

20. The host system of claim 19 wherein the program code that causes the hypervisor to determine that the disk group is out of space comprises program code that causes the hypervisor to:
    determine that a write size of the write request exceeds the advertised physical storage capacity of the disk group.

21. The host system of claim 19 wherein the program code further causes the hypervisor to, prior to allowing the write request to succeed:
    determine whether a logical offset to which the write request is directed is in the in-memory list of logical offsets; and
    if the logical offset is not in the in-memory list:
        decrement the in-memory variable by a write size of the write request; and
        add the logical offset to the in-memory list.

* * * * *